Dec. 8, 1970  J. FLEURY  3,545,306
HYDRAULIC CORRECTORS, NOTABLY FOR TRANSMISSION CONTROL MEMBERS
Filed Dec. 12, 1968  2 Sheets-Sheet 1
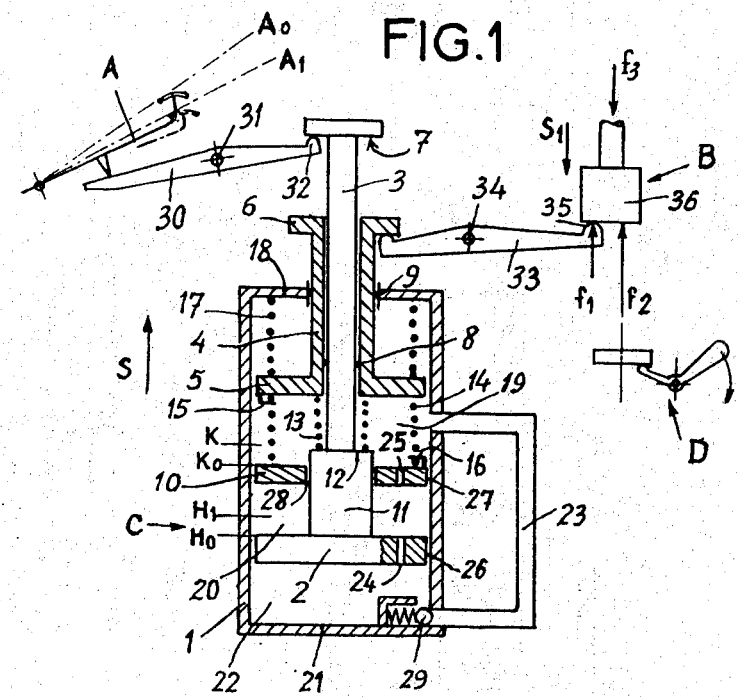
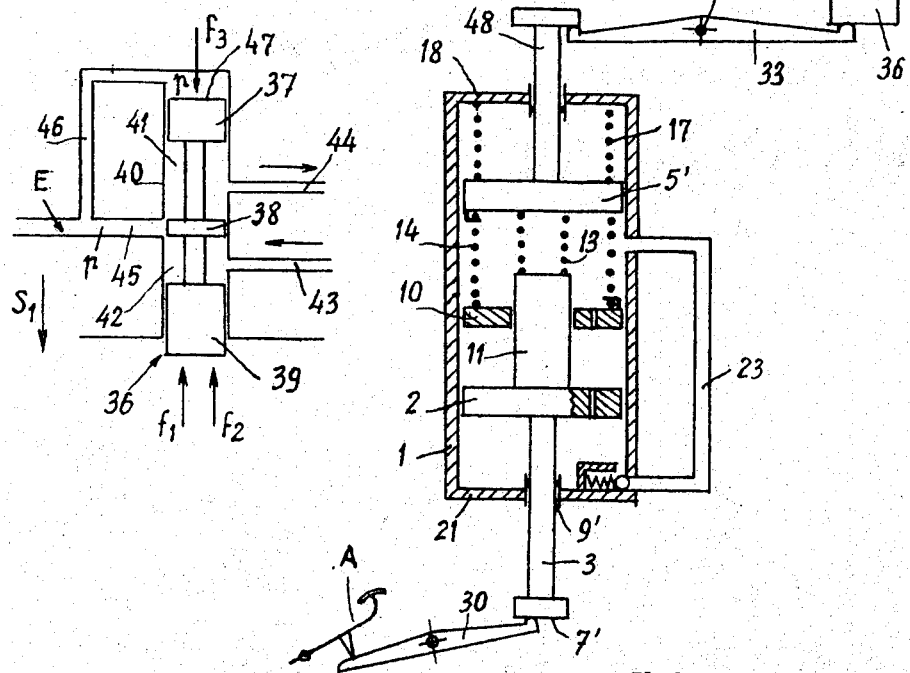
JACQUES FLEURY, Inventor
By *Wendeworth, Lind & Ponack*
Attorneys

Dec. 8, 1970
J. FLEURY
3,545,306
HYDRAULIC CORRECTORS, NOTABLY FOR TRANSMISSION CONTROL MEMBERS
Filed Dec. 12, 1968
2 Sheets-Sheet 2
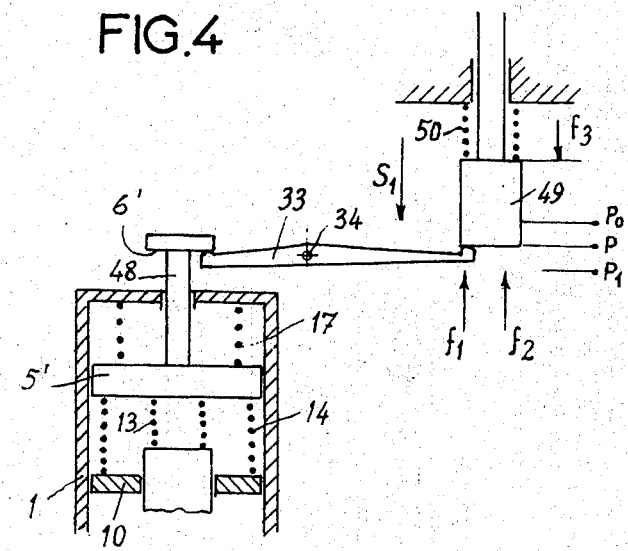
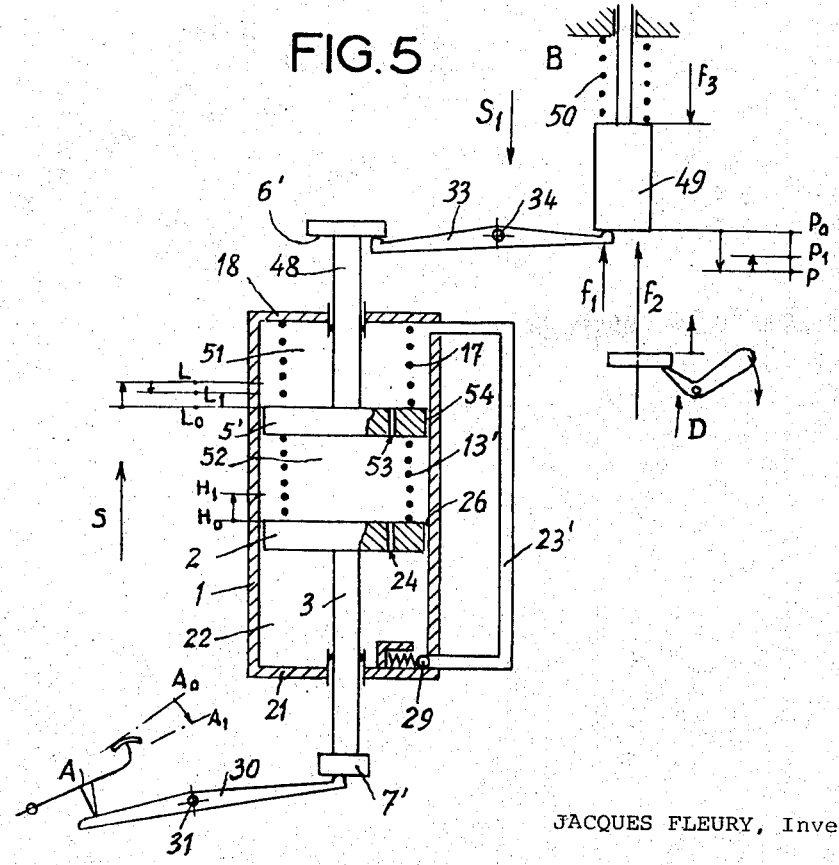
JACQUES FLEURY, Inventor
By *Wenderoth, Lind & Ponack*
Attorneys United States Patent Office 3,545,306
Patented Dec. 8, 1970

3,545,306
HYDRAULIC CORRECTORS, NOTABLY FOR TRANSMISSION CONTROL MEMBERS
Jacques Fleury, Paris, France, assignor to Societe Anonyme Automobiles Citroen, Paris, France
Filed Dec. 12, 1968, Ser. No. 783,381
Claims priority, application France, Dec. 20, 1967, 133,111
Int. Cl. G05g *13/00*
U.S. Cl. 74—843
10 Claims

ABSTRACT OF THE DISCLOSURE

The hydraulic corrector comprises a mechanical-transmission hydraulic device responsive to an actuator representing a first parameter and transmits a first force to said member, and a detector representing a second parameter which transmits to said member another force parallel to said first force and acting in the same direction, said member being on the other hand responsive to a third force representing a third parameter and applied in a direction opposite to that of said first and second forces, said member making the comparison between said forces, the state of unbalance resulting from said comparison involving, in one or the other direction, the displacement of said member and therefore its action.

---

The present invention relates to a hydraulic corrector device for controlling a member, applicable notably to control means of gear-change transmission mechanisms.

In hitherto known change-speed transmissions the automatic gear change control is responsive to the engine load or torque demand through the medium of the means controlling the supply of the air-fuel mixture to the engine, and therefore to the position of the accelerator pedal as a function of the engine speed and/or of the vehicle speed detected by suitable means such as centrifugal devices.

In these known transmission systems the engaged ratio depends only on the position of the accelerator pedal.

It is the specific object of the present invention to provide a device which, by virtue of a hydraulic corrector controlling the member causing for example the change in the transmission ratio, is adapted to determine this change also as a function of the rapidity of the movement imparted to said accelerator pedal.

This hydraulic corrector for controlling a member as a function of two parameters is essentially characterized in that it comprises a mechanical-transmission hydraulic device responsive to an actuator representing the first one of said two parameters, said hydraulic device transmitting to said member a first force, and a detector representing the second one of said two parameters and transmitting to said member a second force parallel to said first force and acting in the same direction, said member being responsive to a third force representing the third parameter which is applied in a direction opposite to that of said first two forces and making the comparison between said forces, the unbalance resulting from said comparison involving, in one or the other direction, the displacement of said member and its action, the rapidity of action of said actuator responsive to the first parameter controlling said member in the direction to positively accentuate the action thereof.

Considering the application of the device of this invention to the member controlling gear-changes in an automatic transmission mechanism, a faster depression of the accelerator pedal will be attended by the engagement of a higher transmission ratio, thus increasing the pick-up characteristic of the vehicle, which is the result usually sought by the car driver.

On the other hand, when the accelerator pedal is released, the device according to this invention will retard the engagement of the lower gear ratio. Thus, in case of irregular or jerky actuation of the accelerator pedal no immediate and therefore untimely and too frequent gear changes will take place.

These and other advantageous features characterizing the present invention will appear more clearly as the following description proceeds with reference to the accompanying drawing illustrating diagrammatically four exemplary forms of embodiment of the hydraulic corrector constituting the subject-matter of this invention. In the drawing:

FIG. 1 is a comprehensive part-sectional schematic view of the device according to this invention, wherein the accelerator pedal actuates the corrector on the same side as the one from which the corrected movement is transmitted;

FIG. 2 shows a detail concerning a change-speed transmission control member and its mode of operation;

FIG. 3 shows a modified form of embodiment wherein the accelerator pedal actuates the corrector on the side opposed to that from which the corrected movement is transmitted;

FIG. 4 shows the details of a modified form of embodiment of the transmission control member, and FIG. 5 is a simplified construction of the device shown in FIG. 3 for actuating a control member according to FIG. 4.

Referring first to FIG. 1, it will be seen that between an accelerator pedal A of an automotive vehicle, of which the position corresponds to a first parameter governing the operation of an automatic gear-change transmission mechanism (not shown), and a member B controlling this transmission mechanism, a hydraulic device C is inserted. The control member B is further connected to a detector D responsive to the vehicle speed, for example a centrifugal detector of known type.

The hydraulic device C consists of a cylinder 1 having slidably mounted therein a first piston 2 rigid with a rod 3 emerging from the cylinder and sliding freely in a sleeve 4 concentric to said rod and having its inner end rigid with another piston 5 adapted to slide in the cylinder 1. The outer end of this sleeve 4 emerges from the cylinder 1, on the same side as the emerging portion of rod 3, and carries a flange-like portion 6. The rod 3 projects beyond this flange and is formed with a head or shoulder 7. Adequate packings 8 are provided between rod 3 and sleeve 4, and other packings 9 are provided between the sleeve 4 and cylinder 1.

An intermediate piston 10 is adapted to slide freely along a reinforced portion 11 of rod 3 and a coil compression spring 13 reacts between the top shoulder 12 of this reinforced portion 11 and piston 5, as shown, so as to counteract any movement of pistons 2 and 5 towards each other.

Another coil compression spring 14 is anchored by means of retaining lugs 15 and 16 to the pistons 5 and 10 respectively, so as to counteract their possible movement toward each other, the length of this spring 14 being such that piston 10 connot engage piston 2 under any circumstances. Another coil compression spring 17 is interposed between the piston 5 and the bottom wall 18 of cylinder 1, to prevent this piston 5 from contacting this bottom.

Piston 10 forms with piston 5 a chamber 19 and with piston 2 another chamber 20; piston 2 forms with the cylinder bottom 21 a chamber 22 connected through a by-pass line 23 to chamber 19. The three chambers 19, 20 and 22 are filled with a suitable incompressible fluid adapted to flow with a limited output through or about pistons 2 and 10 along orifices 24 and 25 formed therein, passage 26 between piston 2 and cylinder 1, passage 27 between piston 10 and cylinder 1, and passage 28 between piston 10 and the reinforcing portion 11 of rod 3. A non-return valve 29 prevents the passage of fluid through said by-pass 23 in the direction from chamber 22 to chamber 19.

The rod 3 is connected to the accelerator pedal A for example by means of a two-armd lever 30 fulcrumed to a fixed pivot pin 31. The accelerator pedal A bears against one end of one arm of said lever 30, the end 32 of the other arm engaging the shoulder 7 of rod 3. Thus, the coupling between pedal A and rod 3 is positive only in the direction corresponding to the depression of said pedal which causes the piston 2 to move in the direction of the arrow S towards piston 5, Another two-armed lever 33 fulcrumed for example to a fixed pivot pin 34 connects the sleeve 4 to the control member B of the transmission mechanism. To this end, one face of flange 6 of sleeve 4 bears against the end of one arm of lever 33 and the end 35 of the opposite arm bears against a slide valve 36 of said control member B. Under these conditions, a sliding movement of piston 5 in the direction of the arrow S corresponds to a sliding movement of slide valve 36 in the direction of the arrow $S_1$.

This slide valve 36 is balanced between the action of parallel forces $f_1$ and $f_2$, and that of a force $f_3$ acting in the opposite direction. The force $f_1$ is produced by the resilient stress exerted by springs 13, 14 and 17 on piston 5 and is transmitted to slide valve 36 by means of the end 35 of lever 33. Force $f_2$ results from the action of detector D responsive to the vehicle speed and increases when the vehicl is accelerating. Both forces $f_1$ and $f_2$ act in opposition to $S_1$.

The force $f_3$ acts in the direction of the arrow $S_1$ and is proportional to the pressure $p$ of the control fluid of a circuit E (FIG. 2) controlling the speed changes of the automatic transmission mechanism. The slide valve 36 comprises three larger bearing surfaces 37, 38 and 39 slidably engaging the bore of a cylinder 40 and forming therebetween a pair of chambers 41 and 42.

An inlet pipe line 43 opening into chamber 42 supplies same with fluid under a pressure $p_A$. An exhaust line 44 opening into chamber 41 permits the return of this fluid to the reservoir (not shown). When the forces $f_1$ and $f_2$ exerted on slide valve 36 push it in the direction opposite to that of the arrow $S_1$, the bearing portion 38 uncover the inlet or port of a pipe line 45 connected to circuit E, thus permitting the flow of fluid under pressure to penetrate into this circuit line and allowing the pressure $p$ prevailing therein to rise to a maximum value $p_A$.

A pipe line 46 branched off line 45 directs the fluid under a pressure $p$ against the outer surface 47 of the slide valve bearing portion 37 so as to exert on this slide valve a force $f_3$ in the direction of the arrow $S_1$. When the sum of forces $f_1$ and $f_2$, on the one hand, and force $f_3$, on the other hand, balance each other, bearing portion 38 close the port of line 45 so that the fluid pressure $p$ will no more vary therein. A slight movement of slide valve 36 in the direction of the arrow $S_1$ will reduce the pressure $p$ in lines 45 and 46, as the fluid can leak through chamber 41 to the exhaust line 44. Now a slight movement of slide valve 36 in the opposite direction will close the exhaust port and permit the ingress of fluid under pressure through chamber 42 into line 45 so as to increase the pressure $p$ therein. As a consequence, the slide valve 36 is stabilized in the vicinity of a constant position while creating in the line 45 a pressure $p$ such that the force $f_3$ will balance or compensate the sum of forces $f_1+f_2$. The gear reduction ratio of the transmission is determined by this pressure $p$; the lower the pressure $p$, the higher the reduction ratio. This pressure is reduced either as a consequence of a reduction in force $f_2$ and therefore of the vehicle speed, or by a decrease in force $f_1$, therefore by depressing the accelerator pedal A.

Now as in practice the valve 36 will not slide appreciably, the same will apply to sleeve 4; therefore, the action exerted by spring 17 on piston 5 is substantially constant.

The above-described device operates in three separate cases as follows:

(1) The accelerator pedal is stabilized: As explained hereinabove, a same transmission ratio is obtained each time the sum of forces $f_1+f_2$ attains a same value.

Thus the gear ratio changes are effected at a vehicle speed that is higher (and therefore inasmuch as $f_2$ is higher) as $f_1$ is lower, and therefore sleeve 4 is moved outwards by a more compressed spring 13; this happens when the rod 3 is moved outwards when the accelerator pedal A is in a more depressed position.

When this pedal is stabilized in this position, no effort is transmitted by spring 14 to piston 5 for piston 10 is free between chambers 19 and 20 where the fluid pressures are equal due to the communication through passages 25, 27 and 28; thus, spring 14 will not disturb the equilibrium of the assembly.

(2) The accelerator pedal is depressed: If the accelerator pedal A is depressed for instance from position $A_0$ to position $A_1$, piston 2 will slide from $H_0$ to $H_1$, thus forcing the mass of fluid in chamber 20 and therefore piston 10 towards the bottom 18 of cylinder 1. Thus, this piston 10 will force the fluid from chamber 19 to chamber 22 through by-pass 23 without any appreciable loss of pressure in these chambers 19 and 22. On the other hand, the pressure will increase in chamber 20 for piston 10 is retarded during its movement by the spring 14 transmitting to piston 5 an effort adding itself to that of spring 13, thus tending to push the sleeve 4 and assisting in reducing the above-defined effort $f_1$. This reduction lowering the pressure in the circuit E of FIG. 2, as already explained hereinabove, is attended by a higher reduction ratio at a higher vehicle speed.

The pressure differential between chambers 20 and 19, on the one hand, and 20 and 22, on the other hand, causes a fluid leakage to take place through passages 25, 27 and 28, and possibly through passages 24 and 26, thus causing pistons 2 and 10 to move towards each other at a limited rate proportional to the output of said leakage. When piston 2 slides from $H_0$ to $H_1$, piston 10 moves from $K_0$ to K; this last position is inasmuch remote from $K_0$ as the relative movement of the two pistons towards each other is reduced, or, in other words, the movement of piston 2 is faster. Thus, the quicker the depression of accelerator pedal A, the longer the displacement of piston 10 and therefore the higher the compression of spring 14 and the greater the reduction of effort $f_1$. Therefore, at any vehicle speed a rapid depression of the accelerator pedal down to a given position will tend to increase the reduction ratio of the transmission more than when the pedal is depressed slowly to the same position, and still more than when the pedal is stabilized in this position.

From its position K the piston 10 continues to move towards piston 2 due to the expansion of spring 14, as long as the pressure in chamber 20 exceeds that in chamber 19, until the stable position $K_0$ is attained, thus restoring the device to the state of equilibrium described in the foregoing.

(3) Releasing the accelerator pedal: When pedal A is released, for example from $A_1$ to $A_0$, the piston 2 urged by spring 13 will compress the fluid in chamber 22. This fluid cannot be discharged from this chamber through the by-pass 23 due to the presence of the non-return valve 29 but it will flow on the other hand towards chamber 20 by leakage through passages 24 and 26. This low-output fluid flow permits only a slow movement of piston 2 from $H_1$ to $H_0$. Therefore, when pedal A is raised rapidly a loss of contact takes place either between lever 30 and the stop-forming shoulder 7 of rod 3, or between this lever 30 and pedal A. This non-positive and retarded return movement of piston 2 towards the bottom 21 of cylinder 1 will damp out the expansion of spring 13 and therefore the increment in force $f_1$, thus tending to retard the decrease in the reduction ratio of the transmission.

Thus, even when the accelerator pedal is quickly released, the decrease in the reduction ratio does not take place immediately, thus avoiding the too near gear changes which would detrimentally take place if the control were not damped when the accelerator pedal is actuated irregularly.

As a modification of the device according to this invention, the arrangement illustrated in FIG. 3 comprises a rod 3 rigid with piston 2 and another rod 48 rigid with a piston 5′, these rods 3, 48 extending through the opposed bottoms 21 and 18 of cylinder 1, respectively. A rod packing 9′ is provided between the bottom 21 of cylinder 1 and the rod 3, but the packing 8 of FIG. 1 is not provided in this structure. The two-armed lever 30 is arranged to actuate the rod 3 from its outer end 7′, the action exerted on lever 33 remaining unchanged; it is clear that the mode of operation described hereinabove with reference to FIGS. 1 and 2 is the same in the case of the construction shown in FIG. 3.

In another modified form of embodiment of the device shown in FIG. 4 the practically stable slide valve 36 of FIGS. 1, 2 and 3 is replaced by a slide valve 49 responsive to a force $f_3$ exerted for example by a spring 50, this slide valve 49 being adapted to perform relatively long axial movements, the transmission gear ratios being changed as a function of the position of slide valve 49.

A movement of slide valve 49 in the direction of the arrow $S_1$ is attended by an increasing gear ratio and, furthermore, by a reduction in the force $f_3$ exerted by spring 50. Otherwise, the mode of operation is the same as in the example illustrated in FIGS. 1 and 2, since the forces involved are the same; however, in this case each equilibrium between the forces $f_1$, $f_2$ and $f_3$, on the one hand, and the action of springs 13, 14 and 17, on the other hand, will give a variable position of the assembly comprising piston 5′, rod 48, lever 33 and slide valve 49.

In the alternate form of embodiment shown in FIG. 5, it is proved that the intermediate piston 10 and spring 14 can be dispensed with by disposing a spring 13′ between pistons 2 and 5′.

As illustrated in FIG. 5, in this case the by-pass 23′ interconnect the endmost chambers 22 and 51, this chamber 51 being formed between the bottom 18 of cylinder 1 and piston 5′, a single chamber 52 separating pistons 2 and 5 from each other. The fluid can leak through the passage 24 formed in piston 2 or 26 about this piston, and also through a passage 53 formed in piston 5′ and/or another passage 54 surrounding this last-named piston. A spring 13′ is disposed directly between the pistons 2 and 5′.

The equilibrium obtained for each fixed position of the accelerator pedal A is the same as that obtained with the arrangement illustrated in FIG. 4 which comprises a piston 10 and a spring 14, since these two component elements play no role in the case of a stabilized control.

On the other hand, if the pedal A is depressed for example by moving same from position $A_0$ to position $A_1$, the piston 2 sliding in this case from $H_0$ to $H_1$, it is the mass of fluid in chamber 52 that will undergo a pressure increment and piston 5′ will move firstly towards the bottom 18 of cylinder 1 inasmuch as the pedal actuation is faster, and then away from said bottom due to the action of spring 17 to a position of equilibrium. The rate of the relative movement of pistons 2 and 5′ towards each other is then limited in proportion to the leakage outputs through passages 53 and 54 of piston 5′ (and possibly through the passages 24 and 26 of piston 2 during its movement from $H_0$ to $H_1$). This movement of piston 5′, relatively fast from $L_0$ to $L$, and then retarded from $L$ to $L_1$, is accompanied by a similar movement of slide valve 49 from $P_0$ to $P$, and then from $P$ to $P_1$. Thus, the quicker the actuation of pedal A, the greater the reduction ratio given by the transmission at position $P$; then, at position $P_1$ the reduction ratio is restored to a lesser value corresponding to the stabilized position of the depressed pedal.

The damping of the movement obtaining during the release or upward movement of the accelerator pedal is the same as that described hereinabove, piston 10 and spring 14 being inoperative during this movement.

I claim:

1. A hydraulic corrector for controlling a transmission mechanism control member of a vehicle engine as a function firstly of a torque demanded from the engine and corresponding to the position of an actuator such as an accelerator pedal, and secondly of the engine or/and the vehicle speed translated by a speed detector means, said control member comprising a slide valve submitted to the pressure controlling the gear change of said transmission, wherein the hydraulic corrector comprises a hydraulic device including mechanical means to connect said actuator to said control member and to transmit to said slide valve of this member a first thrust translating said torque, said speed detector being also connected mechanically to said control member to transmit in conjunction with said first thrust a second thrust parallel to the first one, actuating in the same direction and increasing with said speed, said first and second thrusts being opposite to a third thrust transmitted to said control member slide valve by said pressure controlling the gear change, said slide valve being displaced in one or the other direction by the unbalance resulting from the comparison of said thrusts so involving the action of said control member, said hydraulic device having resilient means permitting said actuator by the rapidity of its action to positively accentuate the action of said control member in changing a gear ratio.

2. A hydraulic corrector as set forth in claim 1, wherein said hydraulic device responsive to the actuator comprises a cylinder having mounted therein for free sliding movement a first piston provided with a rod emerging from said cylinder, a second piston rigid with a rod also emerging from said piston, and a third intermediate piston sliding freely on one portion of one of said two rods, said third piston forming in the cylinder with said first piston a first chamber and with said second piston a second chamber, said first piston forming a third chamber with the bottom of said cylinder, a by-pass connecting said second chamber to said third chamber and an incompressible fluid filling all said chambers of the cylinder.

3. A hydraulic corrector as set forth in claim 2, wherein a non-return valve is inserted in said by-pass to permit the passage of said fluid from said second chamber only to said third chamber.

4. A hydraulic corrector as set forth in claim 2, wherein springs are disposed between said first piston rod and said second piston, said second piston and said intermediate piston and said second piston and said cylinder bottom to counteract the movements towards each other of said pistons and of the second piston to the cylinder bottom, said spring disposed between said second piston and said third intermediate piston preventing any contact between said second and third pistons.

5. A hydraulic corrector as set forth in claim 3, wherein axial passages are provided in said first and third pistons as well as about their peripheries, to permit throttled fluid flow from one chamber to another.

6. A hydraulic corrector as set forth in claim 2, wherein a first lever fulcrumed to a fixed pivot pin is disposed between said actuator and said first piston outer rod end, and a second lever fulcrumed to a fixed pivot pin is disposed between said second piston rod end and said control member slide-valve, whereby the depression of said actuator produces positive movements of said first piston rod to move this piston away from the registering cylinder bottoms, and said second lever exerts on said slide-valve said first thrust.

7. A hydraulic corrector as set forth in claim 2, wherein the rods of said first and second pistons emerge from said cylinder through the same bottom thereof.

8. A hydraulic corrector as set forth in claim 7, wherein the rod of said second piston constitutes a sleeve sliding on the rod of said first piston.

9. A hydraulic corrector as set forth in claim 2, wherein the rods of said first and second pistons emerge through opposite bottoms of said cylinder.

10. A hydraulic corrector as set forth in claim 2, wherein said hydraulic device comprises moving in said cylinder only a first piston and a second piston forming each a chamber with the registering cylinder bottom and a chamber between each other, and a by-pass connecting the chambers formed by each piston with the registering cylinder bottom, axial passages being provided in each piston as well about their peripheries permitting throttled fluid flow from one of said chambers to another.

References Cited

UNITED STATES PATENTS

| | | | |
|---|---|---|---|
| 2,863,327 | 12/1958 | Hobbs | 74—843 |
| 3,059,495 | 10/1962 | Granryd | 74—877 |
| 3,238,806 | 3/1966 | Mullaney | 74—843 |

ARTHUR T. McKEON, Primary Examiner